(12) United States Patent
Stap et al.

(10) Patent No.: US 11,307,946 B2
(45) Date of Patent: Apr. 19, 2022

(54) SYSTEMS AND METHODS FOR INTELLIGENT AVAILABILITY IN A DATABASE AVAILABILITY GROUP

(71) Applicant: Dell Products L.P., Round Rock, TX (US)

(72) Inventors: Cindy L. Stap, Cedar Park, TX (US); Mahmoud B. Ahmadian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 363 days.

(21) Appl. No.: 16/682,177

(22) Filed: Nov. 13, 2019

(65) Prior Publication Data
US 2021/0141701 A1 May 13, 2021

(51) Int. Cl.
| | | |
|---|---|---|
| G06F 11/00 | (2006.01) | |
| G06F 11/20 | (2006.01) | |
| G06F 1/30 | (2006.01) | |
| G06F 9/4401 | (2018.01) | |
| G06F 1/28 | (2006.01) | |

(52) U.S. Cl.
CPC ............ G06F 11/2033 (2013.01); G06F 1/28 (2013.01); G06F 1/30 (2013.01); G06F 1/305 (2013.01); G06F 9/442 (2013.01); G06F 11/203 (2013.01); G06F 11/2035 (2013.01); G06F 11/2048 (2013.01)

(58) Field of Classification Search
CPC ............... G06F 11/203; G06F 11/2033; G06F 11/2035; G06F 1/28; G06F 1/30; G06F 1/305
See application file for complete search history.

(56) References Cited

U.S. PATENT DOCUMENTS

| | | | | |
|---|---|---|---|---|
| 6,304,981 B1* | 10/2001 | Spears | ................... | G06F 11/004 714/22 |
| 9,513,945 B2* | 12/2016 | Shimogawa | ........ | G06F 9/45558 |
| 9,753,828 B1* | 9/2017 | Crow | ........................ | G06F 3/068 |
| 2020/0050522 A1* | 2/2020 | Coleman | ................ | G06F 11/203 |

* cited by examiner

*Primary Examiner* — Marc Duncan
(74) *Attorney, Agent, or Firm* — Jackson Walker L.L.P.

(57) ABSTRACT

A method may include in response to a power event of a power system of an information handling system, determining if an uninterruptible power supply of the information handling system has adequate charge to switchover database resources from the information handling system to one or more other information handling systems integral to a database availability group. The method may also include if the uninterruptible power supply of the information handling system has adequate charge to switchover database resources from the information handling system to one or more other information handling systems integral to the database availability group, causing a shutdown of the information handling system initiated by a power manager of the uninterruptible power supply to abort, determining which of the one or more other information handling systems to switchover the database resources to, and causing switchover of the database resources based on such determination.

15 Claims, 2 Drawing Sheets

SYSTEMS AND METHODS FOR INTELLIGENT AVAILABILITY IN A DATABASE AVAILABILITY GROUP

TECHNICAL FIELD

The present disclosure relates in general to information handling systems, and more particularly to intelligent availability in a database availability group.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, information handling systems store massive amounts of data, and such information handling systems must often be capable of providing continuity of access to such data, including access when an operating system associated with a storage array experiences fault or failure.

In addition, to mitigate the effects of a failure of a power subsystem of an information handling system, information handling systems may often employ Uninterruptible Power Supply (UPS) systems. UPS systems may typically function independent of server workload profiles and applications quality of service and Service level agreements. In the case of a power outage of a power subsystem within an information handling system server, a UPS may begin to provide power to the server and storage and networking that are integral to or coupled to the server. In the absence of an automated method of detecting a power source transition, information handling system users (e.g., information technology administrators) may intervene to ensure that essential services are minimally affected before a UPS runs out of battery charge.

There exist UPS integration software agents for servers (e.g., hypervisors) and other tools for UPS management which may deliver graceful shut down or migration of services to servers not impacted by power outage. Such software agents and tools work well for general purpose services that are virtualized and are not mission critical. However, for some class of mission critical applications such as Microsoft Exchange or other electronic mail applications, data availability and resiliency features are designed to function optimally on bare-metal information handling system deployments. Microsoft Exchange deployments use dense server storage for Exchange databases. In a typical power outage scenario, a UPS power management agent on a server would detect the loss of power and an operating system of the server may initiate a shutdown of the server. A shutdown sequence would initiate a "failover" of Exchange resources to other systems. However, a "failover" entails moving all Exchange services at the same time, often causing resource starvation and system hangs. Oftentimes these resource contentions drastically reduce the quality of service and in some cases cause Exchange database copies to fail. Rectifying a failed copy of an Exchange database may entail reseeding the database copy from a known good copy which impacts availability and performance further. Because Microsoft Exchange Managed Availability service does not have visibility to system power state (operating on battery), it cannot proactively initiate necessary actions to move or "switchover" Exchange services in a streamlined manner.

SUMMARY

In accordance with the teachings of the present disclosure, the disadvantages and problems associated with existing approaches to database availability may be reduced or eliminated.

In accordance with embodiments of the present disclosure, an information handling system may include a processor and a program of instructions implementing an application-level protocol, the program of instructions embodied in a computer-readable medium and configured to, when read and executed by the processor, in response to a power event of a power system of the information handling system, determine if an uninterruptible power supply of the information handling system has adequate charge to switchover database resources from the information handling system to one or more other information handling systems integral to a database availability group. The program of instructions may further be configured to, if the uninterruptible power supply of the information handling system has adequate charge to switchover database resources from the information handling system to one or more other information handling systems integral to the database availability group cause a shutdown of the information handling system initiated by a power manager of the uninterruptible power supply to abort, determine which of the one or more other information handling systems to switchover the database resources to, and cause switchover of the database resources based on such determination.

In accordance with these and other embodiments of the present disclosure, a method may include in response to a power event of a power system of an information handling system, determining if an uninterruptible power supply of the information handling system has adequate charge to switchover database resources from the information handling system to one or more other information handling systems integral to a database availability group. The method may also include if the uninterruptible power supply of the information handling system has adequate charge to switchover database resources from the information handling system to one or more other information handling systems integral to the database availability group, causing a shutdown of the information handling system initiated by a power manager of the uninterruptible power supply to abort, determining which of the one or more other information handling systems to switchover the database resources to, and causing switchover of the database resources based on such determination.

In accordance with these and other embodiments of the present disclosure, an article of manufacture may include a non-transitory computer-readable medium computer-executable instructions carried on the computer-readable medium, the instructions readable by a processor, the instructions, when read and executed, for causing the processor to in response to a power event of a power system of the information handling system, determine if an uninterruptible power supply of the information handling system has adequate charge to switchover database resources from the information handling system to one or more other information handling systems integral to a database availability group. The program of instructions may further be configured to, if the uninterruptible power supply of the information handling system has adequate charge to switchover database resources from the information handling system to one or more other information handling systems integral to the database availability group cause a shutdown of the information handling system initiated by a power manager of the uninterruptible power supply to abort, determine which of the one or more other information handling systems to switchover the database resources to, and cause switchover of the database resources based on such determination.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
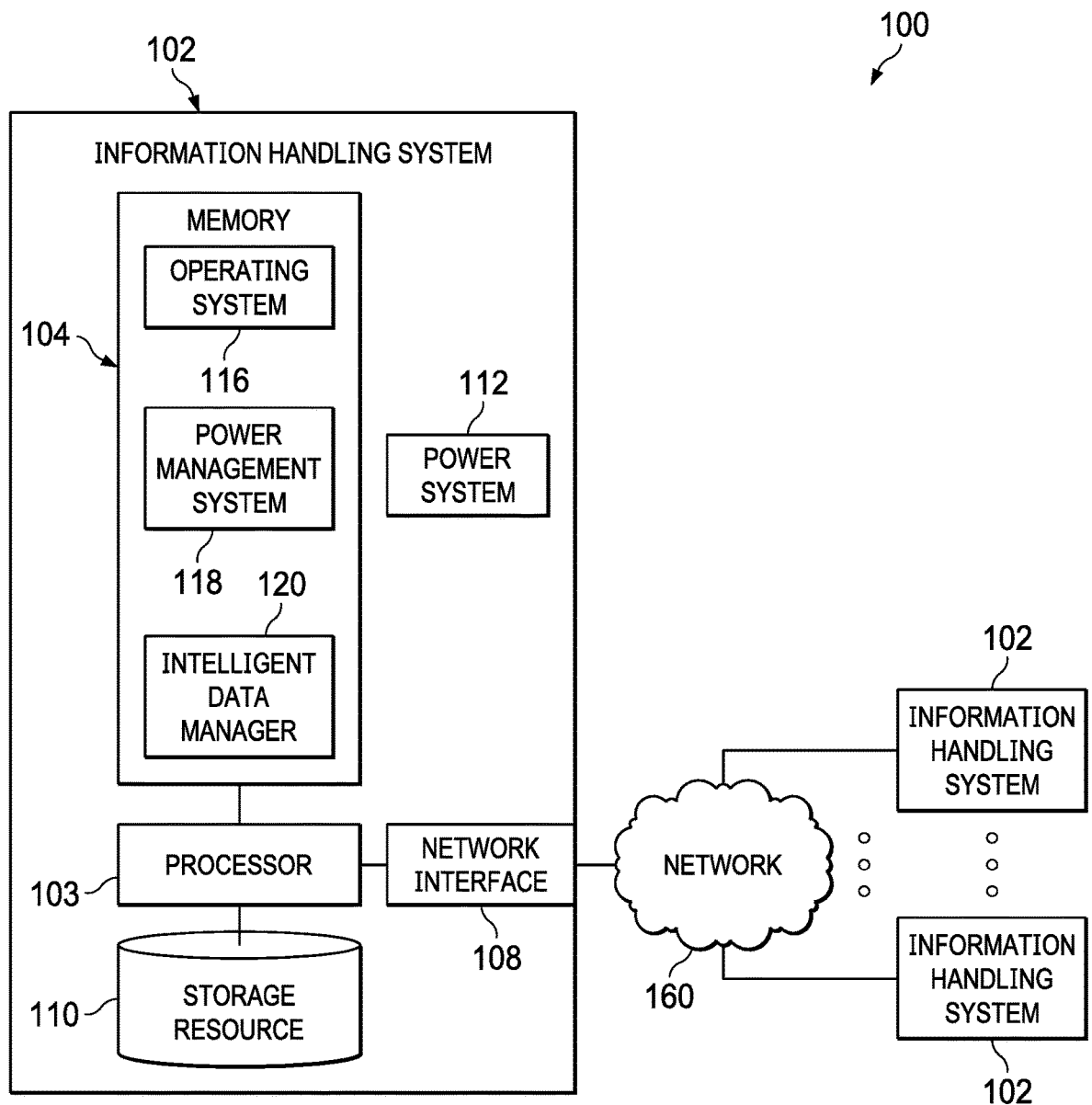
FIG. 1 illustrates a block diagram of a system of information handling systems, in accordance with embodiments of the present disclosure.
Figure 2:
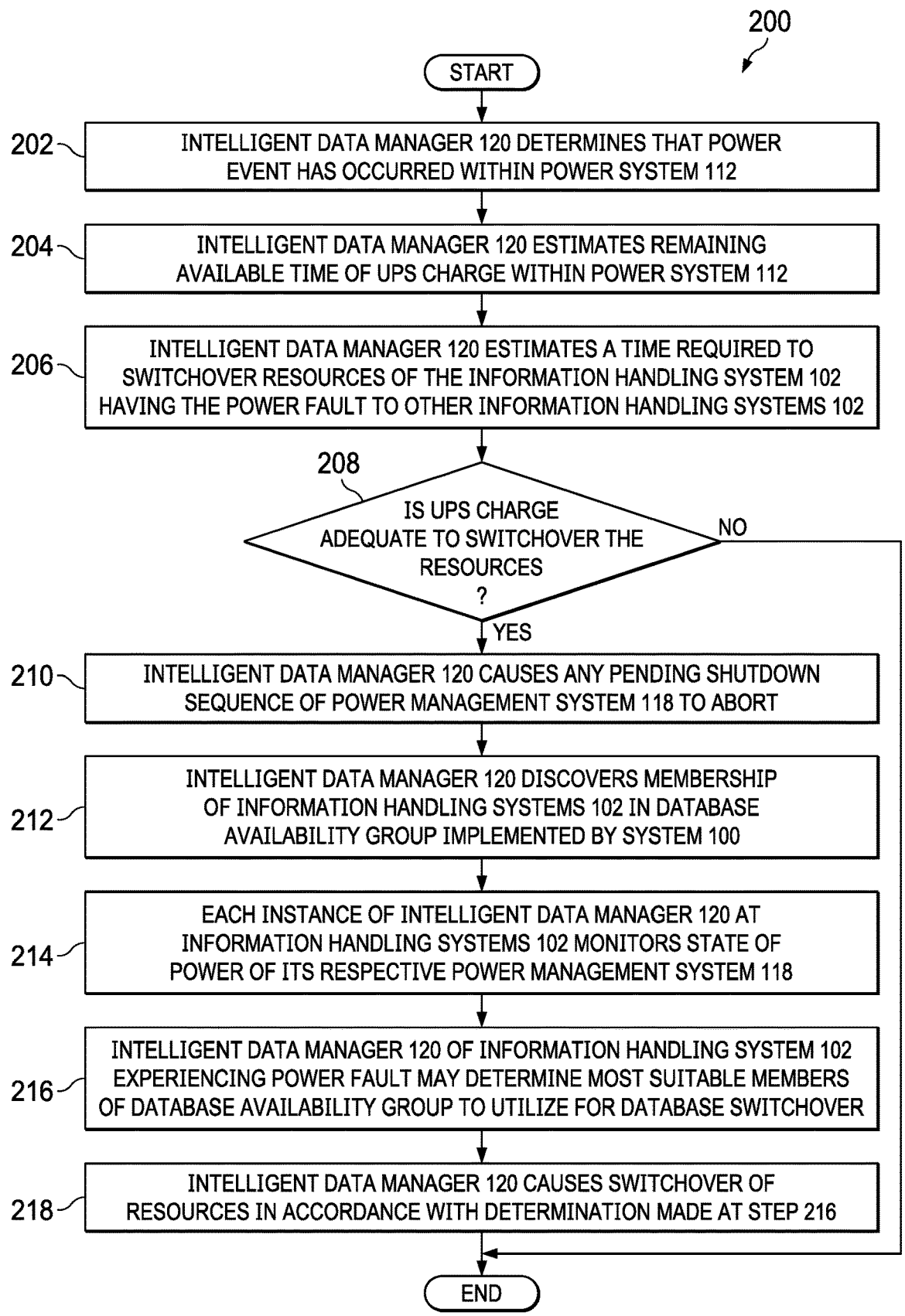
FIG. 2 illustrates a flow chart of an example method for intelligent availability in a database availability group, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of a system 100 of information handling systems 102, in accordance with embodiments of the present disclosure. In some embodiments, system 100 may implement a database availability group, as described in greater detail below. As shown in FIG. 1, system 100 may include a plurality of information handling systems 102 coupled to one another via a network 160. In some embodiments, an information handling system 102 may comprise a server. In these and other embodiments, an information handling system 102 may comprise a personal computer. In other embodiments, an information handling system 102 may be a portable computing device (e.g., a laptop, notebook, tablet, handheld, smart phone, personal digital assistant, etc.). As depicted in FIG. 1, an information handling system 102 may include a processor 103, a memory 104 communicatively coupled to processor 103, a storage resource 110 communicatively coupled to processor 103, a network interface 108 communicatively coupled to processor 103, and a power system 112.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of information handling system 102.

A memory 104 may be communicatively coupled to processor 103 and may include any system, device, or apparatus configured to retain program instructions and/or data for a period of time (e.g., computer-readable media).

Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 116. Operating system 116 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 116. Active portions of operating system 116 may be transferred to memory 104 for execution by processor 103. Although operating system 116 is shown in FIG. 1 as stored in memory 104, in some embodiments operating system 116 may be stored in storage media accessible to processor 103 (e.g., storage resource 110), and active portions of operating system 116 may be transferred from such storage media to memory 104 for execution by processor 103.

Also as shown in FIG. 1, operating system 116 may include a power management system 118 and an intelligent data manager 120. Power management system 118 may include any suitable program of instructions that may be read and executed by processor 103 and configured to manage and/or monitor power system 112. In some embodiments, power management system 118 may implement UPS software for monitoring and/or managing one or more UPSes of power system 112.

Intelligent data manager 120 may include any suitable program of instructions that may be read and executed by processor 103 and configured to maximize availability of databases stored within storage resources 110 of information handling systems 102 in the event of a power fault within a power system 112, as described in greater detail below.

Network interface 108 may comprise any suitable system, apparatus, or device operable to serve as an interface between an information handling system 102 to one or more other information handling systems via network 160. Network interface 108 may enable information handling system 102 to communicate using any suitable transmission protocol and/or standard. In these and other embodiments, network interface 108 may comprise a network interface card, or "NIC." In other embodiments, network interface 108 may be implemented as a virtual NIC (e.g., implemented by software configured to execute on processor 103 of information handling system 102). As shown in FIG. 1, network interface 108 is shown as a component separate from storage controller 106. In some embodiments, network interface 108 may be integral to storage controller 106.

A storage resource 110 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 110 may comprise a plurality of physical storage resources that may appear to an operating system or virtual machine executing on information handling system 102 as a single logical storage unit or virtual storage resource.

In addition to processor 103, memory 104, storage controller 106, network interface 108, and storage resource 110, information handling system 102 may include one or more other information handling resources.

Network 160 may be a network and/or fabric configured to couple information handling systems 102 to each other. In some embodiments, network 160 may include a communication infrastructure, which provides physical connections, and a management layer, which organizes the physical connections and information handling systems communicatively coupled to network 160. Network 160 may be implemented as, or may be a part of, a storage area network (SAN), a PAN, a LAN, a metropolitan area network (MAN), a WAN, a wireless local area network (WLAN), a virtual private network (VPN), an intranet, the Internet or any other appropriate architecture or system that facilitates the communication of signals, data and/or messages (generally referred to as data). Network 160 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 160 and its various components may be implemented using hardware, software, or any combination thereof.

As mentioned above, system 100 may implement a database availability group. A database availability group may be used as part of a service, such as an email service (e.g., Microsoft Exchange). Such a service may manage data redundancy by managing multiple copies of data. For example, as shown in the table below, in a system 100 with five information handling systems 102, each information handling system 102 may have multiple databases mounted. As also shown, each information handling system 102 may maintain one or more active copies of a database and one or more passive copies of a database. For example, information handling system 102-1 may actively serve database DB1 and maintain passive copies of database DB2 and DB3. Passive database copies DB2 and DB3 may not be in service but may be kept in synchronization with their corresponding active copy (e.g., by information handling system 102-1 playing transaction logs from information handling systems 102-3 and 102-5). A passive database copy may be activated if the database service receives a database "switchover" command or if it is determined that an active copy has gone offline.

|  | 102-1 | 102-2 | 102-3 | 102-4 | 102-5 |
| --- | --- | --- | --- | --- | --- |
| Active DB | DB1 | DB4 | DB2 | DB5 | DB3 |
| Passive DB | DB2 | DB5 | DB3 | DB1 | DB4 |
| Passive DB | DB3 | DB1 | DB4 | Db2 | DB5 |

In operation, and as described in greater detail below, an intelligent data manager 120 may in essence execute a service on an information handling system 102 and may integrate with power management system 118 (e.g., including UPS management software) and one or more other services (e.g., email services) to proactively migrate services to information handling systems 102 with good power states, avoiding service down time.

FIG. 2 illustrates a flow chart of an example method 200 for intelligent availability in a database availability group, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, intelligent data manager 120 may determine that a power event has occurred within power system 112. In some embodiments, intelligent data manager 120 may determine that a power event has occurred as a result of an indication of a power event received from power management system 118.

At step 204, responsive to the power event, intelligent data manager 120 may estimate a remaining available time of UPS charge within power system 112. For example, intelligent data manager 120 may estimate the remaining available time by querying power management system 118 to determine a rate of charge depletion.

At step 206, intelligent data manager 120 may determine the number of database copies it manages and may estimate a time required to switchover resources of the information handling system 102 having the power fault to other information handling systems 102.

At step 208, based on the remaining available time and required switchover time, intelligent data manager 120 may determine if UPS charge is adequate to switchover the resources. If the UPS charge is adequate to switchover the resources and all other information handling systems 102 of system 100 are without power faults, method 200 may proceed to step 210. Otherwise, method 200 may end, and information handling system 102 may respond to the power event and power down in accordance with the shutdown sequence initiated by power management system 118.

At step 210, intelligent data manager 120 may cause any pending shutdown sequence of power management system 118 to abort. At step 212, intelligent data manager 120 may discover membership of information handling systems 102 in the database availability group implemented by system 100 (e.g., by using Exchange Web Services application programming interface to discover such membership). At step 214, each instance of intelligent data manager 120 at information handling systems 102 may monitor state of power of its respective power management system 118.

At step 216, intelligent data manager 120 of the information handling system 102 experiencing the power fault may determine the most suitable members of the database availability group to utilize for database switchover. To make such determination, intelligent data manager 120 may take load balancing into consideration in order to distribute activation of passive database copies as evenly as possible among all suitable members of the database availability group. In addition or alternatively, intelligent data manager 120 may use Exchange Web Services to determine resource utilizations (e.g., processor use, free memory capacity, etc.) of members of the database availability group to choose candidate information handling systems 102 for switchover.

At step 218, intelligent data manager 120 may cause the switchover of resources as determined at step 216. At conclusion of step 218, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

In some embodiments, operation of method 200 may be modified to cover a contingency in which power to an affected information handling system 102 returns. In such a scenario, where an information handling system 102 manages a plurality active databases and experiences a power fault requiring operation from UPS, intelligent data manager 120 may executed method 200 to switchover one database at a time. At the conclusion of switchover of each database, intelligent data manager 120 may again evaluate the power state of the affected information handling system 102 and: (a) if the power fault no longer exists, cease execution of method 200 and switchover no further databases; or (b) if the power fault remains, switchover another database.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor;
    a program of instructions implementing an application-level protocol, the program of instructions embodied in a computer-readable medium and configured to, when read and executed by the processor:
        in response to a power event of a power system of the information handling system, determine if an uninterruptible power supply of the information handling system has adequate charge to switchover database resources from the information handling system to one or more other information handling systems integral to a database availability group; and
        if the uninterruptible power supply of the information handling system has adequate charge to switchover database resources from the information handling system to one or more other information handling systems integral to the database availability group:
            cause a shutdown of the information handling system initiated by a power manager of the uninterruptible power supply to abort;
            determine which of the one or more other information handling systems to switchover the database resources to; and
            cause switchover of the database resources based on such determination.

2. The information handling system of claim 1, wherein determining if the uninterruptible power supply of the information handling system has adequate charge to switchover database resources from the information handling system to one or more other information handling systems integral to the database availability group comprises:
    estimating a remaining available time of charge of the uninterruptible power supply; and
    estimating a time required to switchover the database resources.

3. The information handling system of claim 1, wherein determining which of the one or more other information handling systems to switchover the database resources to includes determining a power state of the one or more other information handling systems.

4. The information handling system of claim 1, wherein determining which of the one or more other information handling systems to switchover the database resources to includes load balancing in order to distribute resources as evenly as possible among the one or more information handling systems.

5. The information handling system of claim 1, wherein determining which of the one or more other information handling systems to switchover the database resources to includes determining resource utilizations of the one or more other information handling systems.

6. A method comprising:
    in response to a power event of a power system of an information handling system, determining if an uninterruptible power supply of the information handling system has adequate charge to switchover database resources from the information handling system to one or more other information handling systems integral to a database availability group; and
    if the uninterruptible power supply of the information handling system has adequate charge to switchover database resources from the information handling system to one or more other information handling systems integral to the database availability group:
        causing a shutdown of the information handling system initiated by a power manager of the uninterruptible power supply to abort;
        determining which of the one or more other information handling systems to switchover the database resources to; and
        causing switchover of the database resources based on such determination.

7. The method of claim 6, wherein determining if the uninterruptible power supply of the information handling system has adequate charge to switchover database resources from the information handling system to one or more other information handling systems integral to the database availability group comprises:
    estimating a remaining available time of charge of the uninterruptible power supply; and
    estimating a time required to switchover the database resources.

8. The method of claim 6, wherein determining which of the one or more other information handling systems to switchover the database resources to includes determining a power state of the one or more other information handling systems.

9. The method of claim 6, wherein determining which of the one or more other information handling systems to switchover the database resources to includes load balancing in order to distribute resources as evenly as possible among the one or more other information handling systems.

10. The method of claim 6, wherein determining which of the one or more other information handling systems to switchover the database resources to includes determining resource utilizations of the one or more other information handling systems.

11. An article of manufacture comprising:
    a non-transitory computer-readable medium; and
    computer-executable instructions carried on the computer-readable medium, the instructions readable by a processor, the instructions, when read and executed, for causing the processor to:
        in response to a power event of a power system of the information handling system, determine if an uninterruptible power supply of the information handling system has adequate charge to switchover database resources from the information handling system to one or more other information handling systems integral to a database availability group; and
        if the uninterruptible power supply of the information handling system has adequate charge to switchover database resources from the information handling system to one or more other information handling systems integral to the database availability group:

cause a shutdown of the information handling system initiated by a power manager of the uninterruptible power supply to abort;
determine which of the one or more other information handling systems to switchover the database resources to; and
cause switchover of the database resources based on such determination.

12. The article of claim 11, wherein determining if the uninterruptible power supply of the information handling system has adequate charge to switchover database resources from the information handling system to one or more other information handling systems integral to the database availability group comprises:
estimating a remaining available time of charge of the uninterruptible power supply; and
estimating a time required to switchover the database resources.

13. The article of claim 11, wherein determining which of the one or more other information handling systems to switchover the database resources to includes determining a power state of the one or more other information handling systems.

14. The article of claim 11, wherein determining which of the one or more other information handling systems to switchover the database resources to includes load balancing in order to distribute resources as evenly as possible among the one or more information handling systems.

15. The article of claim 11, wherein determining which of the one or more other information handling systems to switchover the database resources to includes determining resource utilizations of the one or more other information handling systems.

* * * * *